3,413,259
STABILIZED UNSATURATED ETHYLENE-
α-OLEFIN RUBBERS
Harald Blümel, Marl, Germany, assignor to Chemische
Werke Huels A.G., Marl, Germany
No Drawing. Filed Oct. 11, 1966, Ser. No. 585,749
Claims priority, application Germany, Oct. 12, 1965,
C 37,127
20 Claims. (Cl. 260—45.8)

ABSTRACT OF THE DISCLOSURE

For the stabilization of unsaturated ethylene-propylene copolymers, the incorporation of a stabilizing agent of the formula:

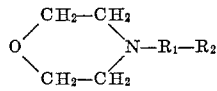

wherein $R_1$ represents an alkylene of 1–20 carbon atoms, aminoalkylene of 1–20 carbon atoms, hydroxyalkylene of 1–20 carbon atoms, hydrocarbon arylene of 5–16 carbon atoms, or hydrocarbon aralkylene of 1–10 carbon atoms in the alkyl portion and 5–16 carbon atoms in the aryl portion, and $R_2$ represents hydrogen or the residue

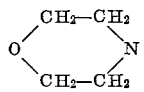

---

This invention relates to an unsaturated ethylene-α-olefin rubber which is relatively stable against the effects of heat, oxygen, light, etc., and in particular to the use of morpholine derivatives in order to impart such stability to the rubber.

It is known that, by the addition of certain compounds, synthetic and natural rubbers can be stabilized against undesired changes. These undesired changes, for example deleterious changes in the color or workability of the rubber, result from storing the rubber over prolonged periods of time, or from the effects of heat, oxygen, or the influence of light.

Generally, it is desired to have the rubber stabilized against many, if not all, of such effects. Previously used stabilizing compounds are generally comprised of either amines, such as, for example, phenyl-β-naphthylamine, N-phenyl-N'-isopropyl-p-phenylenediamine, aldol-α-naphthylamine, di-β-naphthyl-p-phenylenediamine, or phenols, such as, for example, 2,2'-methylene-bis-(4-methyl-6-tert.-butylphenol). Such compounds are added to the rubber either during the manufacture thereof, for example, during the course of the working-up process, or subsequently during one of the further processing operations. In almost all cases, the stabilizers employed for the raw rubber also impart protection against ageing to the vulcanizate. In this manner, natural rubber, butadiene-styrene rubber, polybutadiene rubber, butadiene-acrylontrile rubber, polychloroprene rubber, and unsaturated, as well as saturated ethylene-α-olefin rubber, olefin oxide rubber, and butyl rubber, can be stabilized.

The rubbers having only a minor degree of unsaturation, such as unsaturated ethylene-propylene rubber, butyl rubber, or the polyolefin oxide rubber, having a similar structure, usually require only small amounts of stabilizer, e.g. 0.2% by weight of the rubber, particularly with respect to the influence of heat, as compared to the amount used for rubbers which are unsaturated to a greater degree. However, under severe conditions, for example, when using high mixing temperatures, or in the case of extreme storage conditions, it is recommended, in order to avoid damage to the rubbers as well as to the vulcanizates produced therefrom, to use large quantities of stabilizers, e.g., 1–2% by weight of the rubber.

Depending upon the desired protective effect and the polymer structure, the above-mentioned stabilizers are employed in various quantities in order to impart a stabilizing effect against various conditions encountered during the production, processing, and storage of the polymer and vulcanizates produced therefrom. In each particular case, it is desired to achieve the highest stabilizing effect possible, the ideal case being a non-discoloring stabilizer highly effective even at low concentrations. However, with the use of the previously known stabilizers, there prevails the rule that the particularly effective ones are strongly discoloring, whereas the non-discoloring ones have a comparatively weak stabilizing activity.

The stabilizing effect is determined generally by means of a brief test.

A principal object of this invention, therefore, is to provide an improved, substantially non-discoloring stabilizer for natural and synthetic rubber, and especially for unvulcanized unsaturated ethylene-α-olefin rubber.

Other objects are to provide vulcanizable and vulcanized rubber compositions containing such stabilizers.

Upon further study of the specification and claims, other objects and advantages of the present invention will become apparent.

For the attainment of the above-mentioned objects, there are provided as stabilizers morpholine derivatives of the general formula:

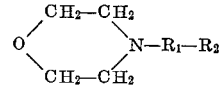

wherein $R_1$ represents an alkylene, aminoalkylene, hydroxyalkylene, aminohydroxyalkylene, arylene, or aralkylene residue, and $R_2$ represents hydrogen or the residue

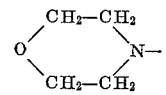

this compound being added in a stabilizing amount, preferably in an amount of 0.05 to 5.0 parts by weight, based on 100 parts by weight of rubber.

It is preferred that $R_1$ represent an alkyl group of 1–20 carbon atoms; an aminoalkyl of preferably 1 to 3 amino groups or a hydroxyalkyl of preferably 1 to 3 hydroxy groups wherein the alkyl residue is of 1–20 carbon atoms, and the amino or hydroxy group is preferably in the ω-position; a hydrocarbon aryl group of 5–16 carbon atoms; or a hydrocarbon aralkyl group wherein the alkyl group is of 1–10 carbon atoms, and the aryl group is of 5–16 carbon atoms. It is also possible to $R_1$ to be an alkyl group substituted by both hydroxy and amino groups, and of course other moieties which do not deleteriously interfere with the stabilizing action of the morpholine derivative.

When $R_2$ represents hydrogen, particularly preferred compounds are N-methyl-, N-ethyl-, N-propyl-, and N-stearyl-morpholine; N-aminomethyl-, N-aminoisobutyl-, and N-aminopropyl-morpholine wherein the amino group is in the ω-position; N-hydroxymethyl-, N-β-hydroxyethyl-, and N-β-hydroxypropyl-morpholine; N-phenyl-morpholine, N-tolyl- and N-benzyl-morpholine. Another representative example is morpholyl-N-ethoxyethylamine which is of the formula

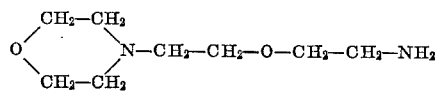

When $R_2$ is not hydrogen, it represents morpholyl, and preferred compounds of this class are, for example, 1,2-dimorpholyl-ethane, 1,3-dimorpholyl-propanol-2.

The stabilizers of this invention are particularly effective when used with unvulcanized, unsaturated ethylene-$\alpha$-olefin rubbers which are linear random elastomeric, vulcanizable copolymers formed using a Ziegler catalyst or equivalent thereof. These copolymers comprise:

10–90, preferably 20–60 mol percent of ethylene;

10–80, preferably 40–70 mol percent of a mono-ethylenically unsaturated $\alpha$-olefin of more than 2 carbon atoms, preferably 3–8, and more preferably 3–4 carbon atoms, such as, for example, propylene or $\alpha$-butylene; and 0.1 to 20, preferably 1 to 10 weight percent, based on the total terpolymer of at least one additional polymerizable polyunsaturated compound, being preferably hydrocarbon, advantageously of 4 to 30, more preferably 4 to 20 carbon atoms, and 2 to 5, preferably 2 to 3 double bonds per monomer, such as, for example, dicyclopentadiene, hexadiene-(1,5), hexadiene-(1,4), decatriene-(1,4,9), cyclooctadiene-(1,5), norbornene, as well as its alkenyl derivatives or addition products with polyunsaturated compounds, such as 5-methylene-norbornene, or other addition products of cyclopentadiene with unsaturated compounds. These copolymers have about 0.1 to 20 carbon-to-carbon double bonds per 1000 carbon atoms. The production of such copolymers is described in the literature, for example, U.S. Patent 3,000,866 (Oct. 26, 1959) and U.S. Patent 2,933,480 (Jan. 25, 1956).

The addition of the morpholine derivatives is conducted either during the polymer production or working-up operation, or during the production or processing of the mixture.

The thus-stabilized unsaturated ethylene-propylene rubbers, under mechanical stress or not, have an increased resistance against heat and the influence of oxygen, while at the same time, there is comparatively little discoloration. The stability of these rubbers in storage is thereby increased to a considerable extent. Aside from the utilization of the morpholine derivatives in unsaturated ethylene-propylene rubbers, these derivatives are also valuable non-discoloring stabilizers when incorporated in other rubbers, such as styrene-butadiene rubber, polybutadiene rubber, polyisoprene rubber, polychloroprene rubber, butyl rubber and butadiene-acrylonitrile rubber.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

For determining the effect of various stabilizers, a recent model of a Brabender plastograph is employed, having a continuous recording device for measuring torque. The kneading assembly used in this connection has a capacity of 75 cm.$^3$ and is provided with a piston. The two kneading arms, provided with cams, can have their rotational velocity varied. The test conditions are as follows:

Extent to which the kneader is filled _____ 0.8
Temperature in the kneader _____ °C__ 190
Revolutions per minute _____ 120
Filling time of the kneader _____ minutes__ 1

For these tests, an unsaturated ethylene-propylene rubber having a propylene content of about 45% by weight is employed which has dicyclopentadiene as the tercomponent. The degree of unsaturation is about 8 double bonds per 1000 carbon atoms. If this rubber is treated, under the above-mentioned test conditions, in the Brabender kneader, there is obtained, in addition to the first maximum at the beginning of the kneading procedure, a second maximum torque after about 20 minutes. This second maximum is produced by the cross-linking reactions taking place in this process. The chronological position of the maximum represents a measure of the thermal stability of the rubber, and is dependent, in this connection, upon the unsaturation of the rubber. This latter fact is demonstrated by Table I wherein extraordinary short periods of time for reaching the second maximum are shown for the polydiene rubbers. By the addition of known stabilizers, or agents affording protection against ageing, of the phenolic as well as the amine type, the period for attaining the second maximum can be substantially extended. Table II shows the effect of various stabilizers, not of this invention, which are added in amounts of 0.25 and 1.0 part by weight per 100 parts by weight of rubber.

It can be seen from the above that the effectiveness of the stabilizer is dependent upon the quantity of stabilizer employed. The most favorable ones are the strongly discoloring p-phenylenediamine derivatives.

Finally, Table III shows the particular protective effect of representative stabilizers of this invention, i.e., N-aminopropyl-morpholine, N-$\beta$-hydroxyethyl-morpholine, and dimorpholyl-ethane. It can be seen therefrom that the stabilizing properties of the stabilizers of this invention are better than all but one of the stabilizers (Test 3), and particularly at lower concentrations. In this connection, it should be noted, however, that the paraphenylenediamines (Test 3), just like the naphthylamines (Test 2), are strongly discoloring stabilizers. In contradistinction thereto, morpholine derivatives as covered by the present invention have substantially no discoloring activity; consequently, this invention fills a gap in the technology of rubbers.

Combined beneficial properties of stabilizing effect and lack of discoloring are also found with the other members of the morpholine derivatives herein described, but the three tabulated Tests 4, 5, and 6 represent the preferred embodiments of this invention.

For forming vulcanized compositions, a vulcanizing amount of a vulcanizing agent can be employed, such as sulfur, under conventional conditions, attention being directed to "Vulcanization of Elastomers," Alliger et al., Reinhold, New York, 1964, particularly pp. 324–332, and more recent literature.

TABLE I

| No. | Rubber Type | Stabilizer [1] | Period From Start of Kneading Treatment to Attainment of 2d Maximum of Torque (Viscosity), Minutes |
| --- | --- | --- | --- |
| I | Unsaturated Ethylene-Propylene Rubber, ca. 8 C=/1,000 C Atoms. | No Stabilizer | ca. 20 |
| II | Unsaturated Ethylene-Propylene Rubber, ca. 2 C=/1,000 C Atoms. | ___do___ | >45 |
| III | Butadiene-Styrene Rubber, Type 1500 | 1.25 Parts by Weight of Phenyl-$\beta$-Naphthylamine. | ca. 3 |
| IV | Polybutadiene Rubber, ca. 98% cis-Proportion. | ___do___ | ca. 2.5 |

[1] Parts by weight of stabilizer per 100 parts by weight of rubber.
NOTES.—Mooney viscosity for I, II, III, and IV: ML-4: 45–55. Unsaturated component for I and II: dicyclopentadiene. Propylene content for I and II: ca. 40% by weight.

TABLE II

| Rubber Type | Type of Stabilizer | Period From Start of Kneading Treatment to Attainment to 2d Maximum of Torque (Viscosity) | |
|---|---|---|---|
| | | 1.0 Part of Stabilizer (Minutes) | 0.25 Part of Stabilizer (Minutes) |
| Unsaturated Ethylene-Propylene Rubber [1] ca. 8 C=/1,000 C Atoms. | Mercaptobenzimidazole [2] | 24 | [4] ca. 20 |
| Do | Laurylamine [2] | 45 | 28 |
| Do | Cyclohexylethylamine [2] | 45 | 30 |
| Do | Phenyl-β-naphthylamine [3] | 45 | 33 |
| Do | Aldol-α-naphthylamine [3] | 45 | 38 |
| Do | Di-β-naphthyl-p-phenylenediamine.[3] | 45 | 45 |
| Do | N-phenyl-N'-isopropyl-p-phenylenediamine.[3] | 45 | 45 |

[1] Mooney viscosity ML-4: 45-55. Unsaturated component: Dicyclopentadiene. Propylene content: ca. 40% by weight.
[2] Non-discoloring.
[3] Discoloring.
[4] I.e., practically identical with the value for the unstabilized rubber I in Table I.

TABLE III

| Test Rubber Type | Type of Stabilizer | Period From Start of Kneading Treatment to Attainment of 2d Maximum of Torque (Viscosity) | |
|---|---|---|---|
| | | 1.0 Part of Stabilizer (Minutes) | 0.10 Part of Stabilizer (Minutes) |
| 1. Unsaturated Ethylene-Propylene Rubber [1] ca. 8 C=/1,000 C Atoms. | 2,2'-methylene-bis-(4-methyl-6-tert.-butylphenol). | 28 | 22 |
| 2. do | Phenyl-β-naphthylamine | >45 | 29 |
| 3. do | N-phenyl-N'-isopropyl-p-phenylenediamine. | >45 | >45 |
| 4. do | N-aminopropyl-morpholine | >45 | 43 |
| 5. do | N-β-hydroxyethyl-morpholine | >45 | 38 |
| 6. do | Dimorpholyl-ethane | >45 | 39 |

[1] Mooney viscosity ML-4: 45-55. Unsaturated component: Dicyclopentadiene. Propylene content: ca. 40% by weight.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A vulcanizable composition comprising an unsaturated linear random copolymer of ethylene, an α-ethylenically unsaturated monoolefin of more than 2 carbon atoms, and a polyethylenically unsaturated hydrocarbon, said copolymer having about 0.1-20 carbon-to-carbon double bonds per 1,000 carbon atoms; and a stabilizing amount of a stabilization agent comprising a compound of the formula:

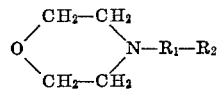

wherein $R_1$ represents an alkylene of 1-20 carbon atoms, aminoalkylene of 1-20 carbon atoms, hydroxyalkylene of 1-20 carbon atoms, hydrocarbon arylene of 5-16 carbon atoms, or hydrocarbon aralkylene of 1-10 carbon atoms in the alkyl portion and 5-16 carbon atoms in the aryl portion, and $R_2$ represents hydrogen or the residue

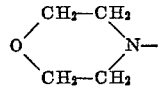

2. A composition as defined by claim 1 wherein the copolymer is comprised of 10-90 mol percent of ethylene, 10-80 mol percent of an α-monoolefin of 3-8 carbon atoms, and 0.1 to 20% by weight, based on the weight of the copolymer, of a polyethylenically unsaturated hydrocarbon of 4-30 carbon atoms and 2-5 double bonds.

3. A composition as defined by claim 2 wherein said compound is present in an amount of 0.05 to 5.0 parts by weight, based on 100 parts by weight of said copolymer.

4. A composition as defined by claim 1 wherein said compound is N-methyl-, N-ethyl-, N-propyl- or N-stearyl-morpholine, N-aminomethyl-, N-aminoisobutyl-, or N-aminopropyl-morpholine, morpholyl-N-ethoxyethylamine, N-hydroxymethyl-, N-β-hydroxyethyl-, or N-β-hydroxypropyl-morpholine, N-phenyl-, N-tolyl-, or N-benzyl-morpholine, 1,2-dimorpholyl-ethane, or 1,3-dimorpholyl-propanol-2.

5. A composition as defined by claim 3 wherein said compound is N-methyl-, N-ethyl-, N-propyl-, or N-stearyl-morpholine, N-aminomethyl-, N-aminoisobutyl-, or N-aminopropyl-morpholine, morpholyl-N-ethoxyethylamine N-hydroxymethyl-, N-β-hydroxyethyl-, or N-β-hydroxypropyl-morpholine, N-phenyl-, N-tolyl-, or N-benzyl-morpoholine, 1,2-dimorpholyl-ethane, or 1,3-dimorpholyl-propanol-2.

6. A vulcanized composition comprising the vulcanizable composition defined by claim 1 vulcanized with a vulcanizing amount of a vulcanizing agent.

7. A vulcanized composition comprising the vulcanizable composition defined by claim 2 vulcanized with a vulcanizing amount of a vulcanizing agent.

8. A vulcanized composition comprising the vulcanizable composition defined by claim 3 vulcanized with a vulcanizing amount of a vulcanizing agent.

9. A vulcanized composition comprising the vulcanizable composition defined by claim 4 vulcanized with a vulcanizing amount of a vulcanizing agent.

10. A vulcanized composition comprising the vulcanizable composition defined by claim 5 vulcanized with a vulcanizing amount of a vulcanizing agent.

11. A composition as defined by claim 1 wherein said stabilization agent consists essentially of said compound.

12. A composition as defined by claim 2 wherein said stabilization agent consists essentially of said compound.

13. A composition as defined by claim 3 wherein said stabilization agent consists essentially of said compound.

14. A composition as defined by claim 4 wherein said stabilization agent consists essentially of said compound.

15. A composition as defined by claim 5 wherein said stabilization agent consists essentially of said compound.

16. A composition as defined by claim 6 wherein said stabilization agent consists essentially of said compound.

17. A composition as defined by claim 7 wherein said stabilization agent consists essentially of said compound.

18. A composition as defined by claim 8 wherein said stabilization agent consists essentially of said compound.

19. A composition as defined by claim 9 wherein said stabilization agent consists essentially of said compound.

20. A composition as defined by claim 10 wherein said stabilization agent consists essentially of said compound.

References Cited

UNITED STATES PATENTS

| | | | |
|---|---|---|---|
| 2,732,366 | 1/1956 | Tubbs et al. | 260—45.8 |
| 3,006,959 | 10/1961 | Armitage et al. | 260—45.8 X |

DONALD E. CZAJA, *Primary Examiner.*

M. J. WELSH, *Assistant Examiner.*